Oct. 11, 1960    S. G. VON STOCKER    2,956,185
UNIVERSAL ULTRASONIC SENDING AND RECEIVING APPARATUS
Filed June 30, 1958

INVENTOR
SELMER G. VON STOCKER

BY
*Peter L. Costas*
ATTORNEY

UNIVERSAL ULTRASONIC SENDING AND RECEIVING APPARATUS

Selmer G. Von Stocker, Mount Lebanon Township, Allegheny County, Pa., assignor to Aluminum Company of America, Pittsburgh, Pa., a corporation of Pennsylvania Filed June 30, 1958, Ser. No. 745,580

3 Claims. (Cl. 310—8.7)

This invention relates to ultrasonic testing apparatus for coupling ultrasonic waves generated by a piezoelectric transducer and a test object through a liquid coupling medium. More particularly, it is directed to a liquid coupling apparatus which permits substantially universal angulation of the transducer with respect to the front surface of the test object.

Ultrasonic inspection techniques have been finding more widespread application with advances and refinements in equipment. However, for more critical inspection, especially of thinner cross-sections, a liquid coupling medium has been necessary to provide a time delay in the reflection of the ultrasonic waves and to eliminate abrasion of thin piezoelectric materials, which may be quartz crystals or lithium sulfate and barium titanate artifacts.

The prevalent commercial method utilizing a liquid coupling medium requires the immersion within a tank of the body to be tested. A search tube containing the transducer (search unit) is passed over the object and flaws are located; subsequently, the search tube may be angulated with respect to the front surface of the tested object in order to obtain the maximum reflection from the noted flaws, which often do not lie parallel to the front surface, and thus determine whether the object is to be rejected by comparison of this reflection with those obtained from standard reference blocks upon which specifications may be based.

This immersion method had definite disadvantages in that large tanks are required and time is consumed in transferring the objects into and from the tanks. It has heretofore been proposed to use apparatus which would provide a self-contained coupling medium, and some have sought to incorporate limited angulation of the transducer for evaluation of flaws. However, these devices have had limitations in that the transducer was restricted in its freedom of angulation and also in that spurious indications would appear on the oscilloscope due to disturbances in the coupling medium, generally caused by entrapped air or rapid flow of coupling medium between the piezoelectric transducer and test object.

It is an object of this invention to provide an apparatus for coupling ultrasonic waves through a self-contained liquid coupling medium which will permit substantially universal angulation of the transducer.

It is also an object to provide apparatus for coupling ultrasonic waves in which the coupling medium is substantially quiescent between the piezoelectric material and test object.

Other objects and advantages of this invention will be readily apparent from the following detailed specification and accompanying drawing, in which.

The present invention contemplates apparatus in which the ultrasonic transducer or search unit is mounted within the hollow bore of a spherical member, which in turn is seated within an annular bearing of the apparatus housing. In this manner, substantially universal angulation of the transducer and its sonic beam can be effected over the desired range (usually up to about 16° from the perpendicular). Additionally, it is desirable to so construct the bore that there is a column of coupling medium about the transducer which rises to a height above the level of the piezoelectric material or front face of the transducer and which communicates with the housing to allow escape of entrapped air from about the transducer.

Figures 1, 3:
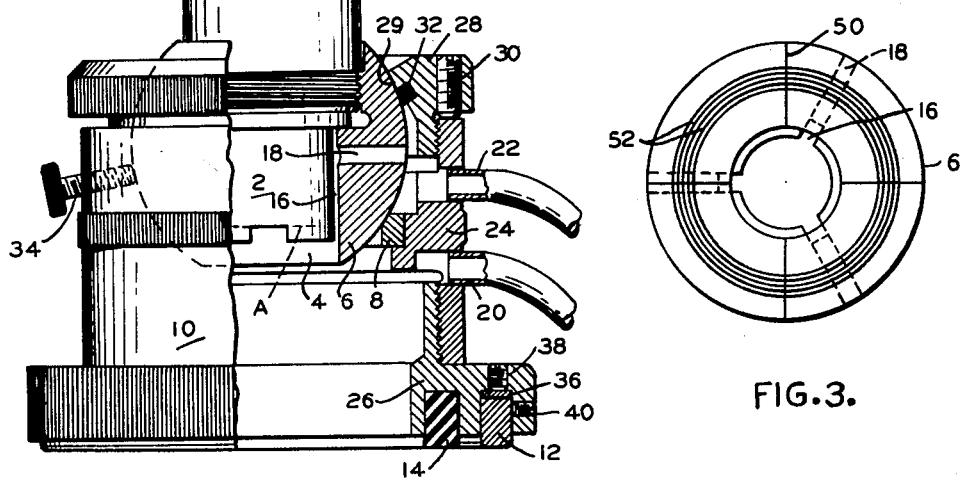
Fig. 1 is a side elevational view of apparatus embodying the present invention, with the right half in sectional elevation and with the ultrasonic transducer (search unit) and accessory electrical equipment mounted therein.
Fig. 3 is a top plan view of the spherical member illustrated in Fig. 2.

Referring to Fig. 1, apparatus embodying the present invention is therein illustrated. The transducer or search unit 2 is mounted within the hollow bore 4 of the spherical member 6, which is seated on the annular bearing 8, preferably fabricated from stainless steel, of the housing 10. The base of the housing 10 is open, and about its periphery are an anti-friction ring 12 upon which the apparatus slides, which may be of Teflon plastic or other suitable material, and a liquid retaining seal or gasket 14, such as sponge rubber or felt. The piezoelectric material or front face of the transducer 2 is shown generally by the dotted line A. Also, the side walls of the transducer 2 may be notched, as shown on Fig. 1.

Extending upward about the transducer is a space or liquid passage 16 in the bore 4 which communicates with the outside of the spherical member 6 through the radial passages 18.

The housing 10 is provided with an inlet 20 for coupling medium and an outlet 22, located above the level of the piezoelectric material A, through which entrapped air and coupling medium may be discharged. As is shown, it is desirable to construct the housing 10 of several elements permitting easy disassembly and interchange of parts and which are conveniently threadably joined together. The main body 24 contains the essential bearing and liquid ports and the overall height of the liquid column may be determined by the height of the base member 26. The cap 28 is provided with an inner annular rib 29 which bears upon and holds the spherical member 6 on the bearing 8 and can exert frictional force thereon to control its ease of rotation, the locking screw 30 serving to maintain this adjustment. A graphite seal 32 is also desirably provided.

One or more locking screws 34 in the body 24 may be tightened to lock the spherical member in a desired position. The groove in the base 26 for the anti-friction ring 12 is provided with an annular washer 36 upon which the several screws 38 spaced about the periphery may be depressed to adjust the height of the ring and compensate for wear. The several screws 20 spaced about the outer periphery of the base 26 lock the ring into place.

Also shown is one type of ultrasonic search tube 42 and its coaxial cable 44.

Figure 2:
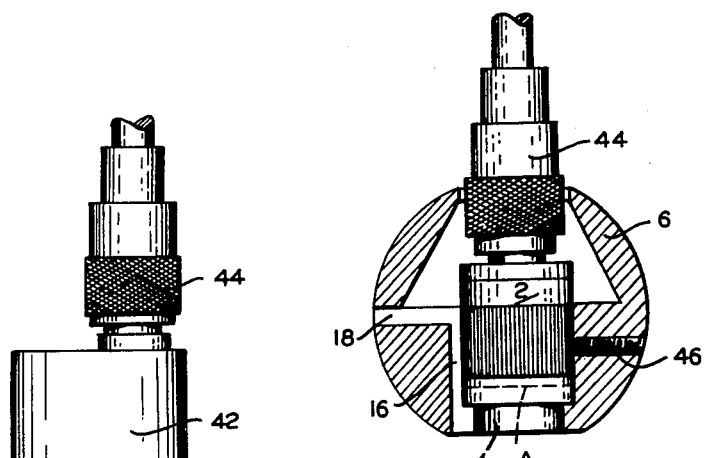
Fig. 2 is a sectional view of a modification of the spherical member of Fig. 1 for receiving a different manufacture of transducer and electrical fittings.

Referring now to Fig. 2, therein illustrated is a modification of the spherical member 6 adapted to receive a different manufacture of ultrasonic transducer to which the coaxial cable may be directly connected. This view also shows the set screws 46 which are spaced about the spherical member 6 for engaging and locking the transducer 2 in place within the bore 4. In this apparatus, several grooves or slots in the bore are used to provide the liquid passage 16 about the transducer 2.

Fig. 3 presents a top plan view of the spherical member 2 illustrated in Fig. 2, showing the radial passages 18 which communicate with the grooves or channels constituting the liquid passage 16. The score lines 50 may be oriented with similarly placed lines on the cap 28 or base 26 to establish the vertical orientation of the transducer 2. The several inscribed degree lines 52, conveniently spaced at intervals of 4°, indicate the deviation from perpendicular in cooperation with the lip of the cap 28.

The several elements of the apparatus are preferably constructed of brass, aluminum or some other corrosion-resistant material.

In the operation of the apparatus, the desired transducer is placed in the spherical member and the electrical fittings are attached thereto. The apparatus is placed on the surface of the test object and water or some other suitable coupling medium is introduced into the apparatus until a steady flow is obtained from the outlet, after which the in-flow rate may be reduced so that it merely compensates for any leakage. The coupling medium may be from a fixed reservoir or from a portable supply carried by the operator.

The apparatus is oriented on flaws and then the spherical member is rotated on the annular bearing until a maximum response from the flaw is obtained. The degree of angulation may be approximated from the degree lines inscribed on the spherical member. Similarly, the apparatus may be used for initially scanning the interior of the test object, either with the transducer parallel to the surface or angulated so as to employ other forms of ultrasonic waves.

The above-described apparatus has been found to permit easy evaluation of flaws by reason of its universal angulation feature since flaws or defects quite often lie in many different planes, especially in forged materials. Additionally, the liquid passage about the transducer facilitates the removal of entrapped air bubbles from the liquid column between the front surface of the transducer or piezoelectric material and the test object, thus eliminating this undesirable source of spurious indications.

Having thus described the invention, I claim:

1. A universal angle ultrasonic coupling apparatus for transmitting ultrasonic waves through a liquid coupling medium between the piezoelectric material of an ultrasonic transducer mounted therein and a test object comprising: a housing having an open base and adapted to contain a column of coupling medium; an annular bearing within said housing; a spherical member seated in said bearing for rotation therein and provided with a centrally disposed bore therethrough adapted to receive a piezoelectric transducer whereby ultrasonic waves may pass through a coupling medium in the housing between the piezoelectric transducer and the test object; an inlet in said housing for introducing coupling medium; an outlet from said housing for discharge of entrapped air and coupling medium.

2. A universal angle ultrasonic coupling apparatus for transmitting ultrasonic waves through a liquid coupling medium between the piezoelectric material of an ultrasonic transducer mounted therein and a test object comprising: a housing having an open base and adapted to contain a column of coupling medium; an annular bearing within said housing; a spherical member seated in said bearing for rotation therein and provided with a centrally disposed bore therethrough adapted to receive a piezoelectric transducer whereby ultrasonic waves may pass through a coupling medium in the housing between the piezoelectric transducer and the test object, said bore providing a liquid passage extending upward from the inner end and communicating with the outside of said spherical member above the level at which the front face of a piezoelectric transducer may be mounted therein; means for holding said spherical member in said housing; an inlet in said housing for introducing coupling medium; an outlet from said housing for discharge of entrapped air and coupling medium, whereby a quiescent column of coupling medium may be maintained between the test object and the piezoelectric transducer during operation of the apparatus.

3. A universal ultrasonic apparatus for transmitting ultrasonic waves through a liquid coupling medium between the piezoelectric material of an ultrasonic transducer mounted therein and a test object comprising: a cylindrical housing having an open base and adapted to contain a column of coupling medium; an annular bearing within said housing; a spherical member seated on said bearing for rotation thereon and provided with a centrally disposed bore therethrough; an ultrasonic transducer mounted in said bore, said bore providing a liquid passage extending upward from the inner end about said ultrasonic transducer mounted therein; radial liquid passages in said spherical member communicating with the said first-mentioned liquid passage above the level of the front face of said transducer mounted therein; means for holding said transducer in said spherical member; means for holding said spherical member in said housing; an inlet in said housing for introducing coupling medium; an outlet in said housing above the level of the front face of said transducer mounted therein for discharge of entrapped air and coupling medium, whereby a quiescent column of coupling medium may be maintained between said ultrasonic transducer and the test object during operation of the apparatus.

References Cited in the file of this patent

UNITED STATES PATENTS

| | | |
|---|---|---|
| 2,592,134 | Firestone | Apr. 8, 1952 |
| 2,819,613 | Neiley | Jan. 14, 1958 |